US008084878B2

(12) United States Patent
Bridwell (10) Patent No.: US 8,084,878 B2
(45) Date of Patent: Dec. 27, 2011

(54) FLUID POWERED ENERGY GENERATOR

(75) Inventor: Randolph E. Bridwell, Sarasota, FL (US)

(73) Assignee: Aerokinetic Energy Corporation, Sarasota, FL (US)

( * ) Notice: Subject to any disclaimer, the term of this patent is extended or adjusted under 35 U.S.C. 154(b) by 561 days.

(21) Appl. No.: 12/103,019

(22) Filed: Apr. 15, 2008

(65) Prior Publication Data

US 2008/0258466 A1    Oct. 23, 2008

Related U.S. Application Data

(60) Provisional application No. 60/912,231, filed on Apr. 17, 2007.

(51) Int. Cl.
*F03D 9/00* (2006.01)
(52) U.S. Cl. ............................................. 290/55; 290/44
(58) Field of Classification Search ................ 290/54, 290/55, 43–44, 1 R; 415/4.2, 4.3, 132 B
See application file for complete search history.

(56) References Cited

U.S. PATENT DOCUMENTS

| | | | |
|---|---|---|---|
| 3,840,225 A | 10/1974 | Fouche | |
| 3,920,354 A | 11/1975 | Decker | |
| 4,068,132 A * | 1/1978 | Bardekoff | 290/55 |
| 4,101,244 A | 7/1978 | Grotberg | |
| 4,130,380 A | 12/1978 | Kaiser | |
| 4,248,568 A | 2/1981 | Lechner | |
| 4,293,279 A | 10/1981 | Bolie | |
| 4,550,259 A | 10/1985 | Bertels | |
| 4,786,235 A * | 11/1988 | Van der Veken | 416/121 |
| 4,816,697 A | 3/1989 | Nalbandyan et al. | |
| 5,584,355 A | 12/1996 | Burns | |
| 5,607,329 A | 3/1997 | Cho et al. | |
| 5,688,178 A | 11/1997 | Emrie | |
| 5,760,515 A | 6/1998 | Burns | |
| 5,769,177 A | 6/1998 | Wickman | |
| 5,850,108 A | 12/1998 | Bernard | |
| 6,177,735 B1 | 1/2001 | Chapman et al. | |
| 6,194,798 B1 | 2/2001 | Lopatinsky | |
| 6,452,287 B1 | 9/2002 | Looker | |
| 6,476,513 B1 | 11/2002 | Gueorguiev | |
| 6,641,367 B1 * | 11/2003 | Van der Klippe | 416/99 |
| 7,105,942 B2 * | 9/2006 | Henriksen | 290/55 |
| 7,132,760 B2 | 11/2006 | Becker | |

(Continued)

FOREIGN PATENT DOCUMENTS

DE    3425313    1/1986

(Continued)

*Primary Examiner* — Michael Zarroli
(74) *Attorney, Agent, or Firm* — Lieberman & Brandsdorfer, LLC (57) ABSTRACT

A power plant with one or more fluid operated generator unit(s) is provided to generate electrical energy. Each generator unit includes one or more rotational members responsive to fluid flow and in communication with one or more magnets and electrically conductive material. Similarly, each generator unit is in electrical communication with a battery or a power grid used to store or utilize electrical energy, respectively. A continuous amount of external energy is required to initiate and maintain movement of the power plant. As the rotational element of the generator unit(s) is exposed to fluid flow, fluid flow causes the rotational element(s) to rotate. This rotation causes the magnets to pass by the electrically conductive material and to generate electrical energy. In response to continuous movement, the generator unit(s) generates electrical energy through fluid flow. The generated electrical energy is stored in an electrical storage apparatus or communicated to a power grid.

29 Claims, 8 Drawing Sheets

U.S. PATENT DOCUMENTS

| | | |
|---|---|---|
| 7,215,037 B2 | 5/2007 | Scalzi |
| 7,296,974 B2 * | 11/2007 | Wobben ............ 416/132 B |
| 2004/0252495 A1 | 12/2004 | Tseng |
| 2005/0239563 A1 | 10/2005 | Pondorfer et al. |
| 2005/0269822 A1 | 12/2005 | Kinpara et al. |
| 2006/0186749 A1 | 8/2006 | Strydom |
| 2006/0272863 A1 | 12/2006 | Donahue |
| 2007/0035133 A1 * | 2/2007 | Parsa .................. 290/1 R |
| 2007/0040385 A1 | 2/2007 | Uchiyama |
| 2007/0126240 A1 | 6/2007 | Richards et al. |
| 2007/0238536 A1 | 10/2007 | Smits |
| 2009/0273189 A1 * | 11/2009 | Iglesia ................ 290/54 |
| 2010/0072756 A1 * | 3/2010 | Bridwell ............. 290/55 |

FOREIGN PATENT DOCUMENTS

| | | |
|---|---|---|
| DE | 10065548 | 7/2002 |
| GB | 2062977 | 5/1981 |
| GB | 2271536 | 4/1994 |
| JP | 58-119976 | 7/1983 |
| KR | 10-2002-21962 | 3/2002 |
| WO | 2004093289 | 10/2004 |
| WO | 2005075819 | 8/2005 |

* cited by examiner

FLUID POWERED ENERGY GENERATOR

CROSS REFERENCE TO RELATED APPLICATION(S)

This is a non-provisional utility patent application claiming benefit of the filing date of U.S. provisional application Ser. No. 60/912,231 filed Apr. 17, 2007, and titled "Fluid Powered Energy Generator", which is hereby incorporated by reference.

FIELD OF THE INVENTION

The present invention relates to an apparatus and method for generating electrical energy from a mechanical source. More specifically, the present invention generates electrical energy from a fluid source and harvests the electrical energy as a power source.

BACKGROUND

Fossil fuels are hydrocarbons, primarily in the form of coal, fuel oil, and natural gas. These fuels are formed from the remains of dead plants and animals over the course of thousands of years. As such, the supply of fuel derived from a fossil fuel source is finite. The economic principle of supply and demand suggests that as hydrocarbon supplies diminish, costs for such supply will rise. Accordingly, there is an incentive to seek alternative energy fuel based upon the laws of economics.

It is known in the art that combustion of fossil fuels creates air pollutants, such as nitrogen oxides, sulfur dioxides, and heavy metals. In addition, combustion of fossil fuels is known to produce radioactive materials in the form of uranium and thorium. Environmental regulation uses a variety of approaches to limit emissions. However, the best solution is an alternative energy source that mitigates or eliminates combustion of fossil fuels.

Fossil fuels in the form of refined gasoline are used to power conventional land vehicles and power plants. In recent years there has been research and development in creation of power plants to supply energy to residential and commercial consumers that do not require fossil fuels, or at least mitigate the quantity of fossil fuels needed to operate the power plant. For example, on the coastline near Cape Cod, Mass., there is a wind energy farm planned to include a large array of windmills to utilize the natural wind currents in the ocean and to convert the wind currents into electrical energy. It is projected that completion of the wind farm could supply about three quarters of the required electrical energy to Cape Cod. This geographical region is being targeted for installation of the wind farm due to the natural wind currents present in the region. However, there are opponents to the construction of the wind farm in this location as it is adjacent to a vacation resort frequented by a predominately wealthy clientele who do not want a view of the wind farm from their residence. Accordingly, there is a need for technology that utilizes fluid flow to produce clean electrical energy that can be supplied to residential and commercial consumers, but is not restricted to a geographical location based upon natural wind currents.

SUMMARY OF THE INVENTION

The present invention relates to an apparatus and method for generating electrical energy from mechanical energy.

In one aspect of the invention, an apparatus is provided with a vertical support member having a proximal end and a distal end. The proximal end is secured to a planar platform. A rotating element is provided with a proximal end and a distal end, with the proximal end of the rotating element attached to the distal end of the vertical support member. The rotating element is adapted to rotate about an axis of the vertical support member. A connection element is provided with a distal end and a proximal end. The proximal end is in communication with the rotating element, and the distal end is in communication with a generator unit. External energy in communication with a motor is used to initiate rotational movement of the rotating element. Fluid flow is created by the initial rotational movement, and electrical energy is generated by exposure of the generator unit to the fluid flow.

In another aspect of the invention, an apparatus is provided with a first vertical support member having a proximal end and a distal end. The proximal end is secured to a planar platform. The first vertical support member remains stationary. A second vertical support member is provided with a proximal end and a distal end. The proximal end is in communication with the distal end of the first vertical support member. A rotating element is provided with a proximal end and a distal end. The proximal end of the rotating element is attached to the second vertical support member, and the rotating element is adapted to rotate about an axis of the second vertical support member. The second vertical support member rotates about its vertical axis in conjunction with rotation of the rotating element. A first enclosure is provided to house a first generator unit. The enclosure is attached to a distal end of the rotating element. External energy in communication with a motor is utilized to provide rotational movement of the rotating element. Fluid flow is created by the initial rotational movement, and electrical energy is generated by exposure of the first generator unit to the fluid flow.

Other features and advantages of this invention will become apparent from the following detailed description of the presently preferred embodiments of the invention taken in conjunction with the accompanying drawings.

DETAILED DESCRIPTION

Overview

The present invention relates to an apparatus and method for generating electricity based upon fluid flow and an energy source. A power plant is provided that generates electrical energy from a mechanical energy fluid flow. The power plant is configured with a plurality of turbines that are in communication with a motor and an electrical energy storage device and/or a power grid. Movement of the turbines is based upon external energy provided to a motor in communication with the power plant. After the turbines have established movement in a fluid environment, the fluid causes rotation of the turbines. Rotational elements of the turbines generate electrical energy through the presence and proximity of magnets to electrically conductive material. The turbines generate electrical energy through movement of the rotational elements in a fluid flow. The generated electrical energy may be stored in a battery and/or an external electrical energy storage device. In one embodiment, electrical energy generated by the power plant may be communicated to an electric power grid. Energy communicated to the power grid is supplied to the power grid for consuming and is not stored therein.

Technical Details

Figure 1:
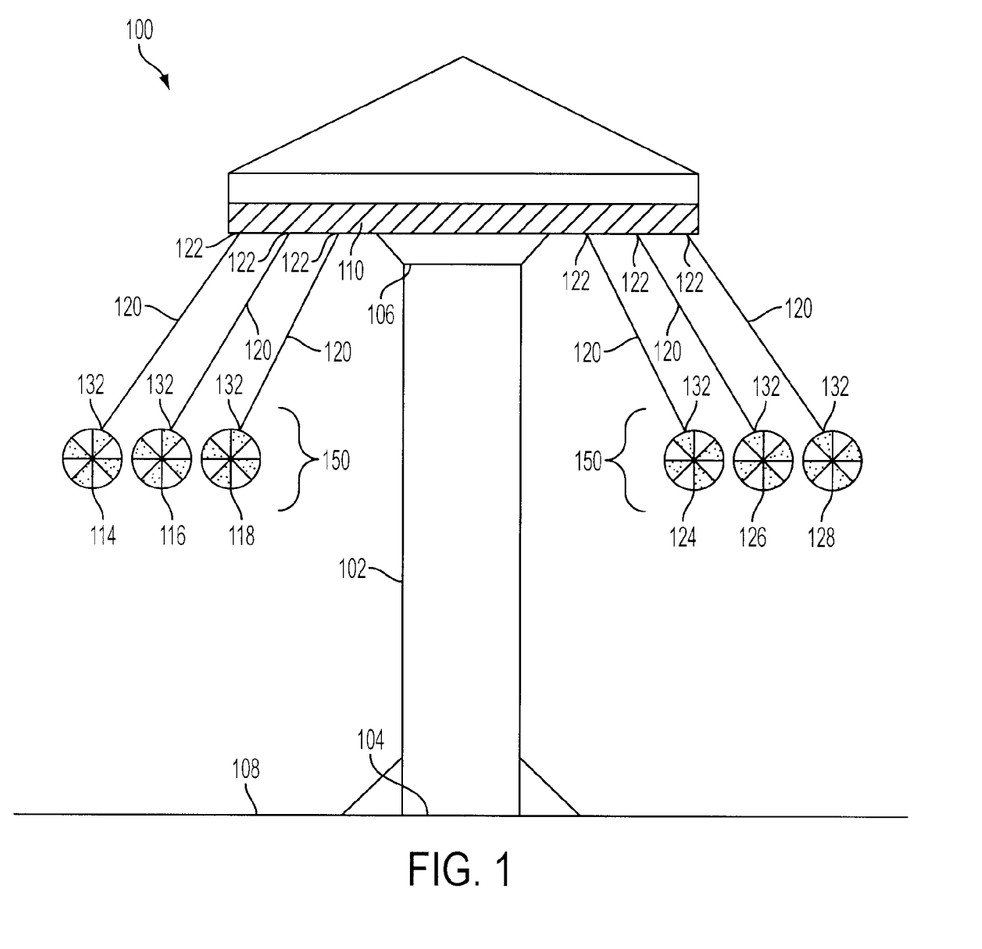
FIG. 1 is an elevational view of one embodiment of a power plant with fluid generators.

FIG. 1 is an elevational view of one embodiment of a power plant (100) with one or more generator units. As shown, the power plant (100) includes a central vertical member (102) with a plurality of generator units (114), (116), (118), (124), (126), and (128) in communication with the vertical member (102). More specifically, the vertical member (102) includes a proximal end (104) and a distal end (106). The proximal end (104) of the vertical member (102) is stationary and fixed to a planar platform (108). The distal end (106) of the vertical member (102) is remote from the proximal end (104) and is in communication with a rotating arm (110), hereinafter referred to as a rotor arm. In one embodiment, the rotating arm may be in the form of a rotating element that is either rigid or flexible. Accordingly, the scope of the invention should not be limited to a rigid rotating arm. The rotor arm (110) is configured to rotate about the axis of the vertical member (102) during operation. One or more connection elements (120) are provided with the rotor arm (110). Each connection element (120) has a proximal end (122) and a distal end (132). The proximal end (122) of the connection element (120) is in communication with the rotor arm (110), and the distal end (132) of the connection element (120) is in communication with one of the generator units (114)-(118) and (124)-(128). In one embodiment, the distal end (132) of the connection element (120) may be in communication with an enclosure sized to house one or more generator units. The generator units (114)-(118) and (124)-(128) are generators that create electrical energy in response to fluid flow. In one embodiment, the generator units (114)-(128) are integrated units with one or more blades that are in communication with one or more magnets and electrically conductive material. The blade(s) rotate about an axis in response to fluid flow and produce electrical energy. In one embodiment, an alternative material may be substituted for the magnets, wherein the alternative material produces electrical energy when placed in proximity to electrically conductive material.

As shown in FIG. 1, the generator units (114)-(118) and (124)-(128) of the power plant (100) are shown in a raised position (150). In one embodiment, the generator units of the power plant (100) are in communication with or adjacent to the planar platform (108) when the power plant (100) is stationary (not shown), and the generator units are raised from the planar platform (108) during active use of the power plant (100) as shown in FIG. 1.

Figure 2:
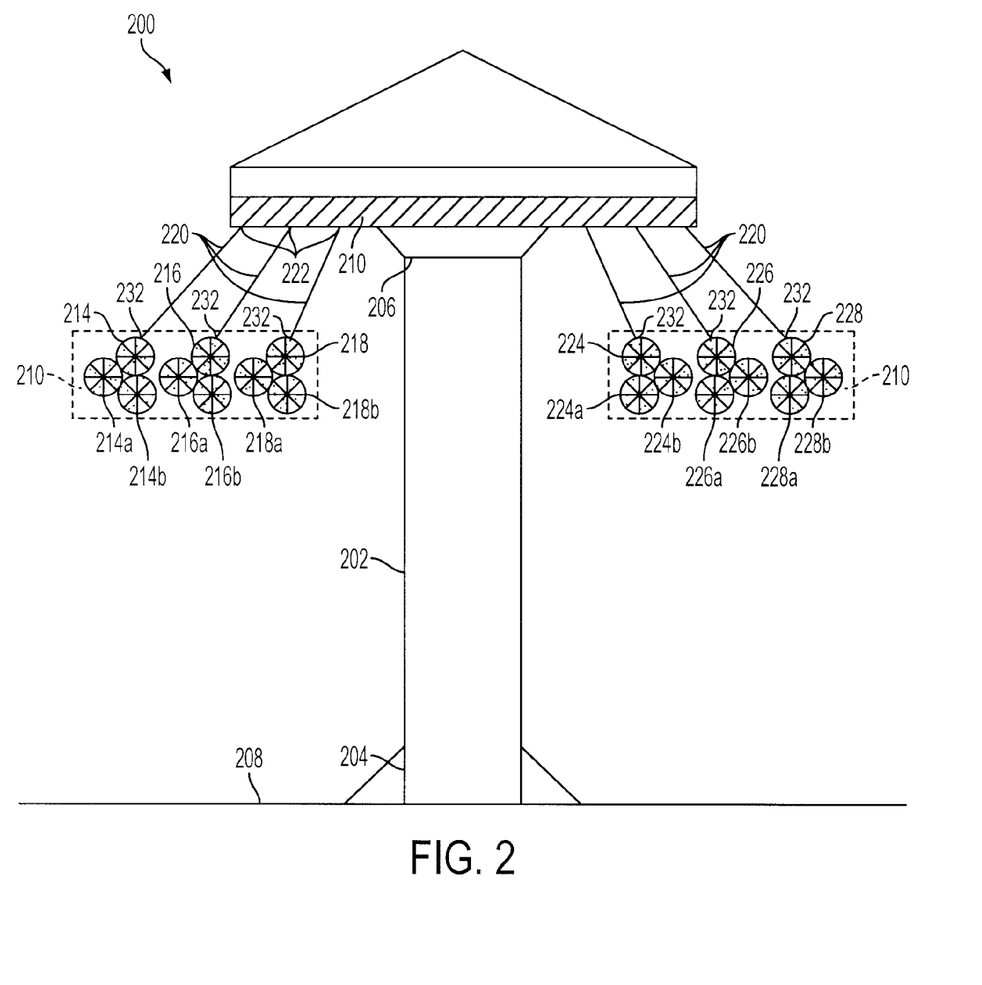
FIG. 2 is an elevational view of another embodiment of a power plant with fluid operated generators.

FIG. 2 is an elevational view of a power plant (200) similar to that shown in FIG. 1 but modified with respect to placement of the generator unit(s). As shown, the power plant (200) includes a central vertical member (202) with a plurality of groupings of generator units (210) in communication with the vertical member (202). More specifically, the vertical member (202) includes a proximal end (204) and a distal end (206). The proximal end (204) of the vertical member (202) is stationary and fixed to a planar platform (208). The distal end of the vertical member (202) is remote from the proximal end (204) and is in communication with a rotating arm (210), hereinafter referred to as a rotor arm. The rotor arm (210) is configured to rotate about the axis of the vertical member (202) during operation. One or more connection elements (220) are provided with the rotor arm (210). Each connection element (220) has a proximal end (222) and a distal end (232). The proximal end (222) of each connection element is in communication with the rotor arm (210), and the distal end (232) of each connection element (220) is in communication with one of the primary generator units (214), (216), (218), (224), (226), and (228). Each primary generator unit (214), (216), (218), (224), (226), and (228) is shown to include one or more secondary units adjacent thereto. More specifically, primary generator unit (214) has secondary units (214b) and (214c) in mechanical and/or electrical communication with the primary unit (214). Similarly, primary generator unit (216) has secondary units (216b) and (216c) in mechanical and/or electrical communication with the primary unit (216), primary generator unit (218) has secondary units (218b) and (218c) in mechanical and/or electrical communication with the primary unit (218), primary generator unit (224) has secondary units (224b) and (224c) in mechanical and/or electrical communication with the primary unit (224), primary generator unit (226) has secondary units (226b) and (226c) in mechanical and/or electrical communication with the primary unit (226), and primary generator unit (228) has secondary units (228b) and (228c) in mechanical and/or electrical communication with the primary unit (228). In one embodiment, a direct electrical and/or mechanical connection of the generator unit(s) to the rotor arm (110) is limited to the primary unit(s), with the secondary unit(s) having a direct electrical and/or mechanical connection to the primary generator unit(s). Similarly, in one embodiment, the distal end (232) of the connection element (220) may be in communication with an enclosure sized to house one or more generator units. Accordingly, the capacity of the power plant may be increased by attaching one or more secondary generator unit(s) to one or more of the primary generator unit(s).

Figure 3:
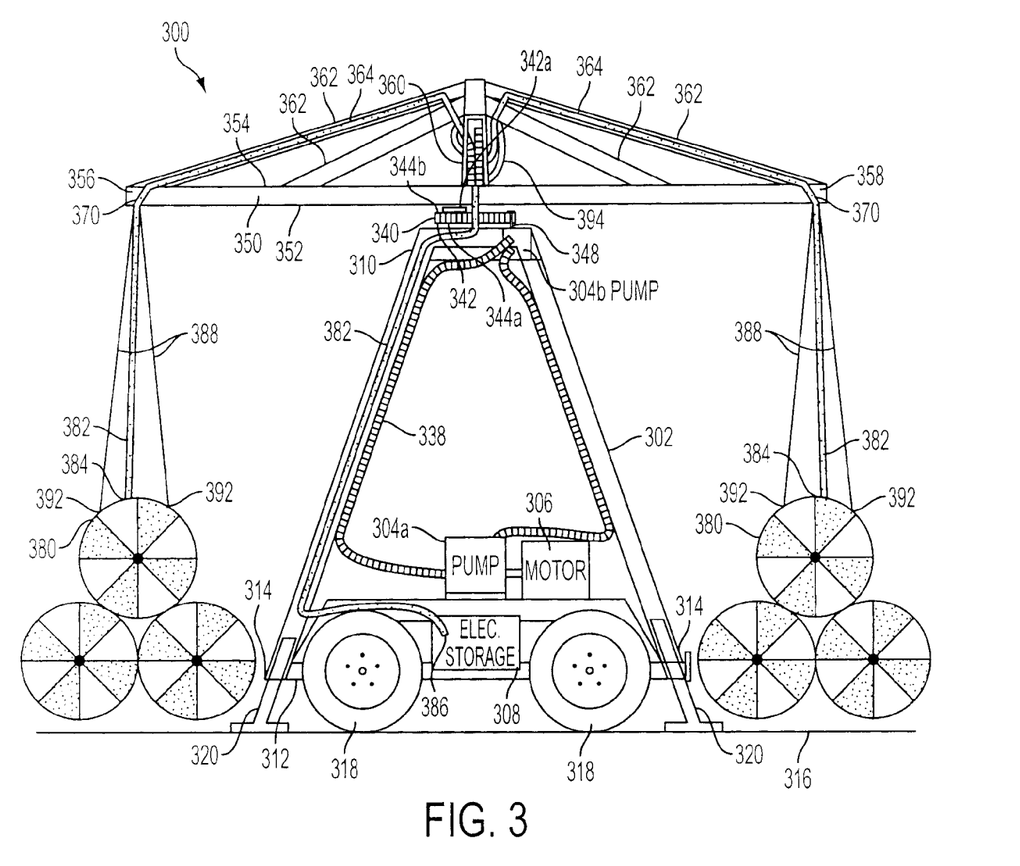
FIG. 3 is a side view of the power plant of FIG. 2.

FIG. 3 is a side view of the power plant unit (300) of FIG. 1 in a stationary position. As shown, the power plant has a central vertical member (302) that houses equipment to operate the power plant. The equipment shown herein includes a pump (304), a motor (306), and an electrical energy storage device (308). However, the equipment may be modified depending upon the requirements for the specific power plant and its associated elements. In one embodiment, a gear box may be substituted in place of the pump. Similarly, in one embodiment, a covering (not shown) may be employed to enclose the motor and gear box combination, or the motor and pump combination. The covering facilitates protecting the items stored therein to external debris. In addition, one or more sensors may be employed with the covering to detect intrusion therein. Accordingly, the combination of the pump (304) and motor (306), or the gear box and motor (306) are employed to operate the power plant (300).

The central vertical member (302) is shown as a single element. In one embodiment, the central vertical member (302) may include several vertical structures that comprise a vertical support to the power plant unit (300). A proximal end (312) of the vertical member (302) is stationary and adjacent to a planar platform (316). In one embodiment, the proximal end (312) of the vertical member (302) is in communication with one or more wheels (318), and one or more anchor elements (320). The anchor elements (320) are in communication with the proximal end (312) of the vertical member (302) and are configured to be placed vertically. As shown in FIG. 3, the anchor elements (320) are stationary and in communication with the horizontal platform (316). Extension of the anchor elements (320) enables the structure of the power plant (300) to be raised or lowered with respect to the stationary platform (316). Although only two anchor elements (320) are shown herein, in one embodiment, the power plant unit (300) may include more anchor elements (320) to secure the power plant unit (300) in a stationary position. Similarly, in one embodiment, the power plant unit (300) may only require a single anchor element (320) to prevent the wheels (318) from rotating and enabling the power plant (300) to be displaced. Furthermore, as shown herein, there are two wheels (318), one adjacent to each of the anchor elements. In one embodiment, the power plant unit (300) may include additional wheels (318) to assist with movement of the power plant unit (300) from a stationary position. Similarly, in one embodiment, the power plant unit (300) may only require a single wheel (318) to support movement of the power plant unit (300) from a stationary position.

Furthermore, as shown in FIG. 3, each of the anchor elements (320) is mounted telescopically in the central vertical member (302). In one embodiment, the central vertical element may include a locking mechanism (not shown) to secure the anchor element (320) to a set position with respect to the central vertical member (302). Such a position may include a raised position, a lowered position, or any position in between. The locking mechanism (not shown) enables the height of the power plant unit (300) to be adjusted. In one embodiment, the power plant unit (300) may require a height adjustment for various reasons, including physical height restrictions associated with placement of the power plant unit (300) for operation. Accordingly, the vertical extension and height of the power plant unit (300) may be modified based upon the length of the anchor elements (320) and an associated locking mechanism (not shown).

As noted above, the power plant unit (300) in one embodiment is comprised of a first pump (304a), a motor (306), an electrical energy storage device (308), a second pump (304b), a motion transfer element (340), and one or more generator units (380) to generate electrical energy. As shown, the central vertical member (302) is in communication with a rotating arm (350). A mechanism (340) is provided to transmit energy to facilitate movement of the rotating arm (350) about the axis of the central vertical member (302). In one embodiment and as shown in FIG. 3, the mechanism (340) is in the form of a gear mounted adjacent to a distal end (310) of the central vertical member (302). Similarly, in one embodiment, the pumps (304a) and (304b) are hydraulic pumps and assist the gear (340) with rotation by providing the gear (340) with hydraulic fluid through a hose (338) from the first pump (304a) to the second pump (304b). The second pump is in communication with the mechanism (340) via a shaft (348) to provide rotational motion to the mechanism (340). However, the invention should not be limited to a hydraulic pump for communication of a rotational force to the rotating arm (350) via the gear (340). In one embodiment, any mechanical or electrical device that can cause movement of the rotational arm(s) may be employed. For example, a belt system or a direct drive system may be employed. Accordingly, the scope of the invention should not be limited to a hydraulic pump and motor in communication with the rotating arm (350).

The gear (340) has a posterior side (344a) and an anterior side (344b). The posterior side (344a) is mounted adjacent to a distal end (310) of the vertical member (302), and the anterior side (344b) is mounted adjacent to the rotating arm (350). Similarly, a posterior side (352) of the rotating arm (350) is mounted adjacent to the anterior side (344b) of the gear (340), and an anterior side (354) of the rotating arm (350) is in communication with a secondary vertical member (360) and one or more support members (362). The rotating arm (350) has a first end (356) and a second end (358). The first end (356) and the second end (358) of the rotating arm (350) is in communication with a connection element (370) that extends to a generator unit (380). Each generator unit (380) has an electrical wire (382) to transfer electrical energy to an electrical storage device (308) or an electric power grid (not shown). As shown the electrical wire (382) has a distal end (384) in communication with the generator unit (380) and a proximal end (386) in communication with the electrical storage device (308). The electrical wire (382) is shown herein to extend from the storage device (308), through the central vertical member (302) to the secondary vertical member (360) and through the support member (362) in communication with the first end (356) of the rotating arm (350). Similarly, the electrical wire (382) may extend from the storage device (308), through the central vertical member (302) to the secondary vertical member (360), and through the support member (362) in communication with the second end (358) of the rotating arm (350). The wire (382) connects the generator unit (380) to the electrical storage device (308).

In one embodiment, the wire (382) may follow an alternate path from the generator unit (380) to the storage device (308). As shown, a slip ring (342) is employed as an electrical interface between the generator unit (380) and the storage device (308). An electrical connection is provided from the rotating generator unit (380) to the slip ring (342). One or more fixed contacts (342a) are provided and in contact with the slip ring and serve as an electrical transfer mechanism between the rotating generator unit (380) and the static part of the system (308). A wire is shown in here to communicate electrical energy between the generator unit (380) and the storage device (308) via the slip ring (342). In one embodiment, an alternate connection may be implemented between the generator unit (380) and the storage device (308) via the slip ring (342) that facilitates communication and transmission of electrical energy between the rotating generator unit (380) and the static electrical storage device (308). Accordingly, slip ring (342) and fixed contact (342a) are employed to facilitate an electrical connection between the electrical storage device (308) and each generator unit (380).

A connection element (388) is provided to secure each generator unit (380) to the rotating arm (350). The connection element (388) provides vertical lift and support to the generator unit (380). The connection element (388) has a first end (392) in communication with the generator unit (380) and a second end (394) in communication with the secondary vertical member (360). In one embodiment, the generator unit may require two or more connection elements (388) connected to different parts of the generator unit (380) to provide proper lift and support of the generator unit (380). The quantity of connection elements required to provide lift and support of the generator unit may depend upon the size and weight of the generator unit (380), the size and length of the connection element (388), and the configuration of the rotating arm (350), support arm(s) (362) and vertical members (302) and (362). Similarly, in one embodiment, the support arm(s) (362) has an interior portion (364) that functions as a conduit from the second vertical member (360) to the first and second ends (356), (358), respectively, of the rotating arm (350) for communication of the electrical wire (382) between generator unit(s) (380), electrical storage (308), and/or connection element(s) (388). This mitigates exposure of the connection element(s) (388) and/or wire (382) from exposure to external elements. In addition, the internal housing of the support arm(s) (362) prevents the connection element (388) and wire (382) from developing a kink or another encumbrance that may affect the integrity and performance of the generator unit (380).

Connection element (388) and the electrical wire (382) are in communication with both the generator unit (380) and one or both of the vertical members (302) and (360). In one embodiment, a rotating wire transfer system (394) is provided at the interface of the secondary vertical member (360) with the central vertical member (302). The wire transfer system (394) functions as a mechanism to adjust the length of the connection element (388) and the length of the electrical wire (382). In one embodiment, a control system (not shown) communicates with the wire transfer system (394) to dynamically adjust the position and/or length of the wire (382) and/or connection element (388) with respect to the rotational speed of the rotating arm(s) (350). By increasing the length of the wire (382) and/or connection element (388), i.e. adding distance between the rotating arm of the generator unit(s), the fluid flow is increased. An increase in fluid flow may lend to an increase in energy generated by the generator(s) in the path of the fluid flow. Details of a control system associated with the adjustment of the connection element (388) and the wire (382) are shown in detail in FIG. 8.

Figure 4:
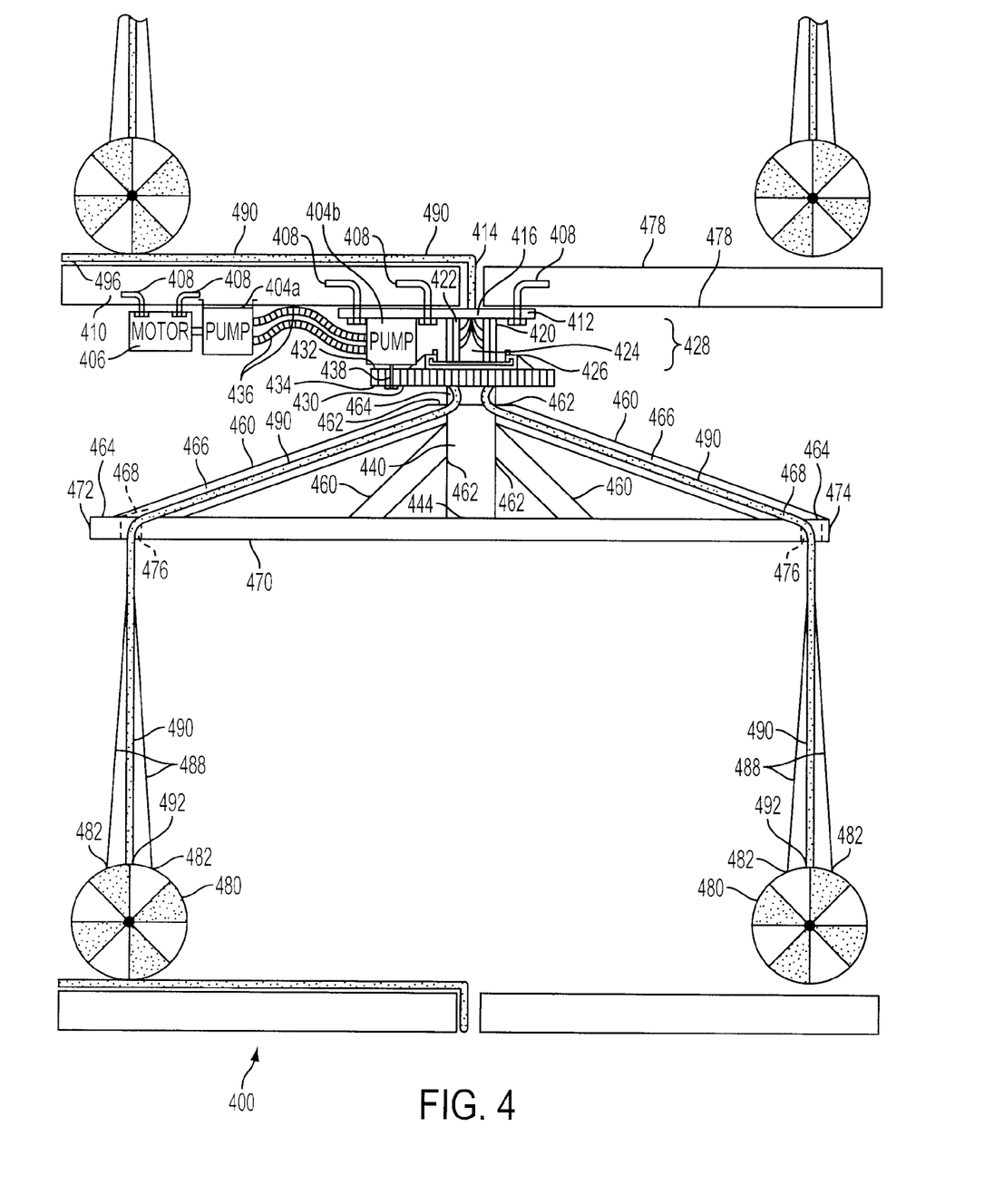
FIG. 4 is a side view of another embodiment of the power plant inverted from the structure shown in FIG. 3.

As shown above in FIGS. 1-3, in one embodiment, the motor (306) and the pump (304) that operate the power plant unit (300) are located planar with one or more anchor elements (320). However, the configuration of the power plant unit (300) should not be limited to that illustrated in FIGS. 2 and 3. FIG. 4 is a front view of an alternative layout and placement of a power plant unit (400) that share some of the elements and structure of the power plant unit (300) shown in FIG. 3. As shown, the power plant unit (400) has a first pump (404a) in communication with a motor (406) that are secured to a primary planar surface (410). The first pump (404a) is also in communication with a second pump (404b). In one embodiment, the pumps (404a) and (404b) and motor (406) may be configured so that they are jointly secured to the primary planar surface (410). One or more securing elements (408) are used to secure the pumps (404a) and (404b) and motor (406) to the primary planar surface (410). In one embodiment, the securing element may be in the form of a hook, an anchor, or an alternative mechanical attachment element. The structure of the power plant unit (400) is similar to that shown in FIG. 3. However, the elements of the power plant are inverted in that the elements illustrated herein descend from the primary planar surface (410) as opposed to ascending from the planar surface as shown in FIG. 3.

The elements of the power plant unit (400) will now be discussed in detail. An aperture (414) is provided in the primary planar surface (410) to receive the electrical wire (490) from the generator unit(s) (480). A secondary planar surface (412) with an aperture (416) is secured to the primary planar surface (410). The aperture (414) of the secondary planar surface (412) is set to align with the aperture (414) of the primary planar surface (410) to accommodate receipt of one or electrical wires between the generator unit(s) (480) and an electrical storage device (not shown). A second vertical extension (420) is secured to the secondary planar surface (410) perpendicular or near perpendicular to the secondary planar surface (410). The second vertical extension (420) has a conduit (426) that extends the length of the extension (420). The conduit (426) is position to align with apertures (404) and (414) of the respective planar surfaces. At such time as the second vertical extension (420) is positioned with the secondary planar surface (412), the proximal end (422) is adjacent to the secondary planar surface (412) and the distal end is adjacent to an anterior side (432) of a gear (430). A posterior side (434) of the gear (430) is adjacent to a proximal end (442) of a first vertical extension (440). The first vertical extension (440) is in communication with one or more support arms (460) and one or more rotating arms (470). Each support arm (460) has a proximal end (462) and a distal end (464). The proximal end (462) is mounted adjacent to the proximal end (442) of the first vertical extension (440). In one embodiment, one or more of the support arms (460) has a conduit (466) that extends through a central portion thereof and it receives one or more electrical wires that are in communication with one or more generator unit(s) (480), and one or more connecting elements (488) to support the generator unit(s) (480) with respect to the rotating arm (470). The distal end (464) of the support arm(s) (460) is adjacent to the rotating arm(s) (470). Each rotating arm (470) has a first end (472) and a second end (474). The distal end (464) of one support arm (460) is adjacent to the first end (472) of the rotating arm (470), and the distal end (464) of a second support arm (460) is adjacent to the second end (474) of the rotating arm (470).

One or more connection elements (488) extend through the support arms (460) to the respective end of the rotating arm (470). An aperture (476) is provided at the end of rotating arm at the point where the support arm (460) is adjacent to the end of the rotating arm. The aperture (476) of the rotating arm aligns with an aperture (468) at a distal end (464) of the support arm (460), and is sized to accommodate passage of one or more connection elements (488) and one or more electrical wires (490). As shown in FIG. 4, a distal end (482) of the connection elements supports the generator unit(s) (480), and a distal end (492) of the wire (490) is in communication with the generator unit(s) (480). A proximal end (496) of the wire (490) is in communication with an electrical storage device (not shown). Accordingly, as the generator unit(s) (480) generates electrical energy, the wire (490) transmits the energy to the electrical storage device.

As in the structure of the power plant (300), the modified power plant (400) includes a first pump (404a) in communication with a second pump (404b) through one or more hoses (436). The second pump (404b) is in communication with the rotation mechanism (430) via a shaft (438) to provide rotational motion to the rotation mechanism (430).

The power plant unit (400) of FIG. 4 includes a wire transfer system (428) at the interface of the second vertical extension (420) with the anterior side (432) of the gear (430). The wire transfer system (428) is a mechanism to adjust the position of the connection element(s) (488) and the electrical wire (490). Accordingly, both the electrical wire (490) and the connection element(s) (488) are in communication with the wire transfer system (428).

On of the primary differences of the power plants units (300) and (400) of FIGS. 3 and 4, respectively, is the inverse layout. With respect to either structure, the power plants may be arranged in a stacked environment. More specifically, as shown in FIG. 4, the primary planar surface (410) has an anterior surface (476) and a posterior surface (478). As shown herein, the anterior surface (476) is in communication with the secondary planar surface (412). In one embodiment, a second primary surface (not shown) may be spaced apart from the posterior surface (478) of the primary planar surface (410) to accommodate a second power plant. Similarly, the power plant (300) of FIG. 3 may include an arrangement of stacked power plants in a vertical manner wherein they are spaced apart by a sufficient quantity of vertical space required to operate the power plant.

Figure 5:
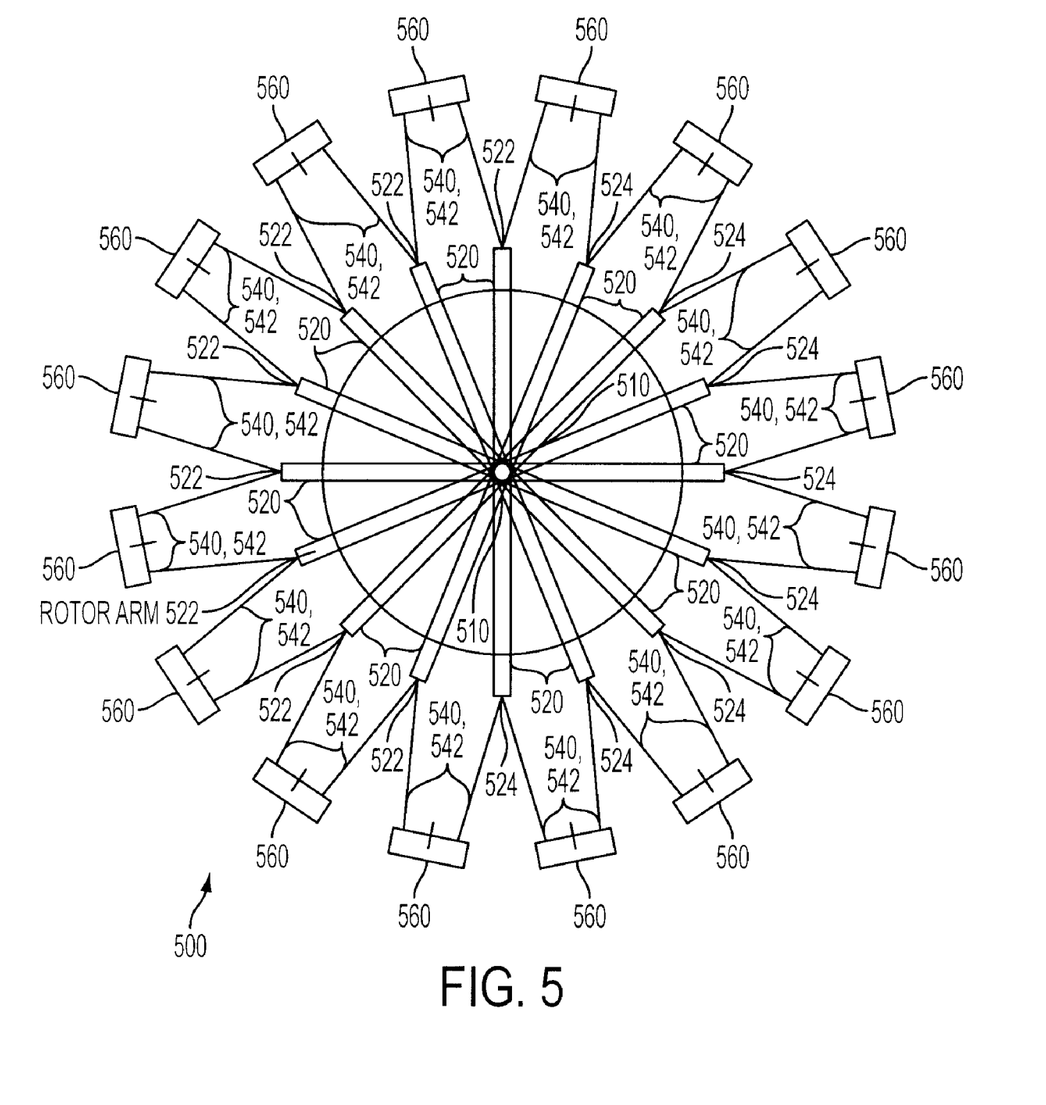
FIG. 5 is a top view of the power plant shown in FIG. 2.

FIG. 5 is a top view of the power plant unit (500) of FIG. 3. As shown, there is a central vertical extension (410) that is in communication with one or more support arms (not shown) and one or more rotating arms (520). Each rotating arm (520) has a first end (522) and a second end (524). An electrical wire (540) and a connection element (542) extend from the rotating arm (520) to a respective generator unit (560). In one embodiment, two separate electrical wires (540) and/or connection elements (542) may extend from each end of each rotating arm (520) to two adjacent but separate generator units (560). This embodiment provides extra vertical support and life to each generator unit (560) as well as separation between adjacent generator units (560).

Figure 6:
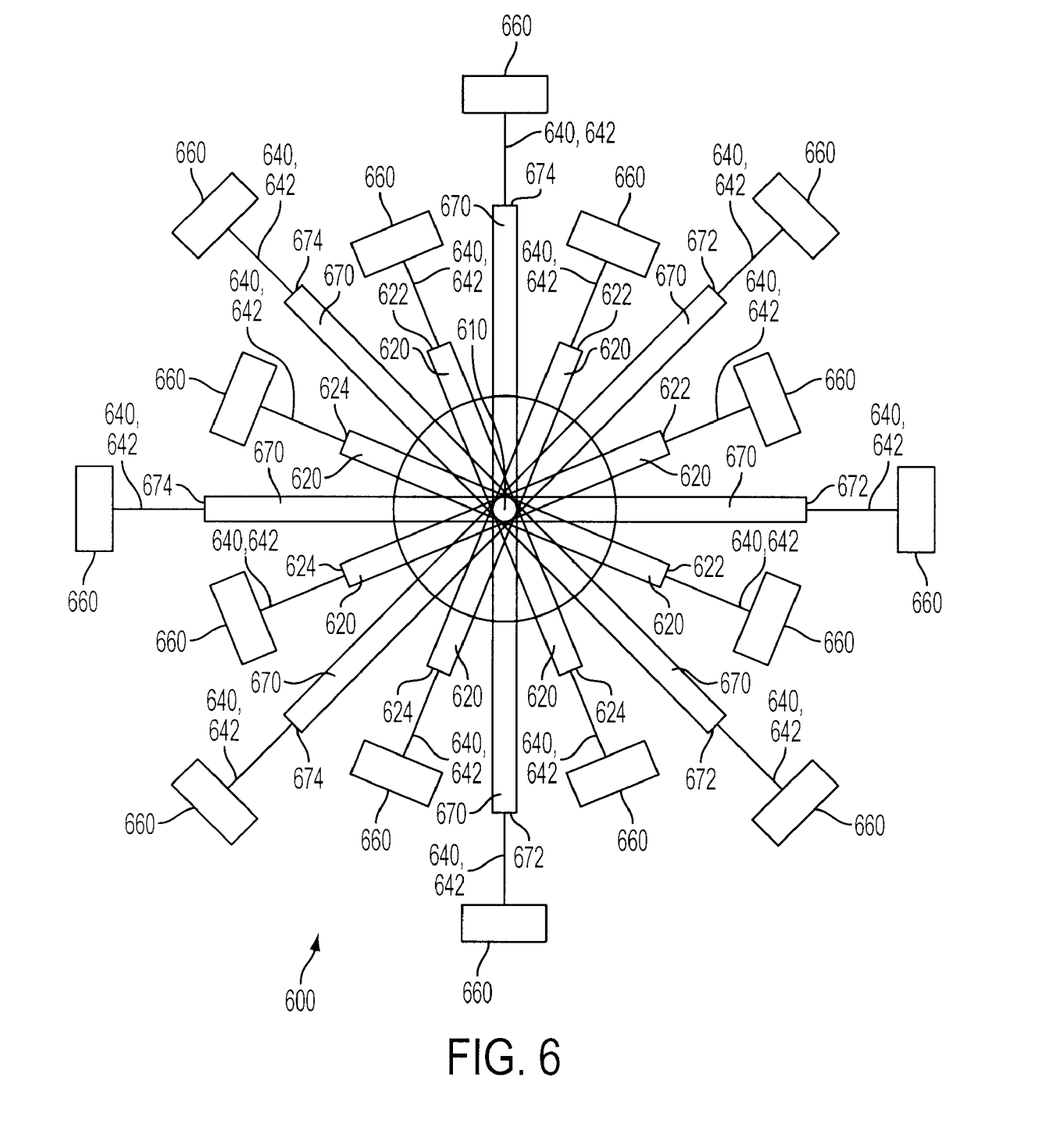
FIG. 6 is a top view of the power plant shown in FIG. 4 with different size rotor elements.

FIG. 6 is a top view of a power plant unit (600) that is an enlarged power plant in comparison to power plant unit (500) of FIG. 5. As shown, there is a central vertical extension (610) that is in communication with a plurality of rotating arms and supports arms (not shown). There are two categories of rotating arms. The first category of rotating arms (620) is in communication with a central vertical member (610) and has a short length. Each rotating arm (620) has a first end (622) and a second end (624). A wire (640) and a connection element (642) extend from the rotating arm (620) to a respective generator unit (660). In one embodiment, a plurality of wires (640) and connecting elements (642) may extend from each end (622), (624) of each rotating arm (620) to one or more generator units (660). This provides extra vertical support to each generator unit (660) as well as separation between adjacent generator units (660). The second category of rotating arms (670) is in communication with the central vertical member (610) and has a length greater than the rotating arm (620) in the first category. Each rotating arm (670) has a first end (672) and a second end (674). A wire (640) and a connection element (642) extend from the rotating arm (670) to a respective generator unit (660). In one embodiment, a plurality of wires (640) and connecting elements (642) may extend from each end of each rotating arm (670) to one or more generator units (660). This provides extra vertical support to each generator unit (660) as well as separation between adjacent generator units (660). In addition, since the length of the second category of rotating arm(s) (670) is different from the length of the first category of rotating arms (620), the generator unit(s) (660) in communication with the first category of rotating arms (620) are in a different wind zone than the generator unit(s) (660) in communication with the second category of rotating arms (670). Accordingly, by placing generator units in different wind zones a greater amount of fluid flow is received by each generator unit.

Figure 7:
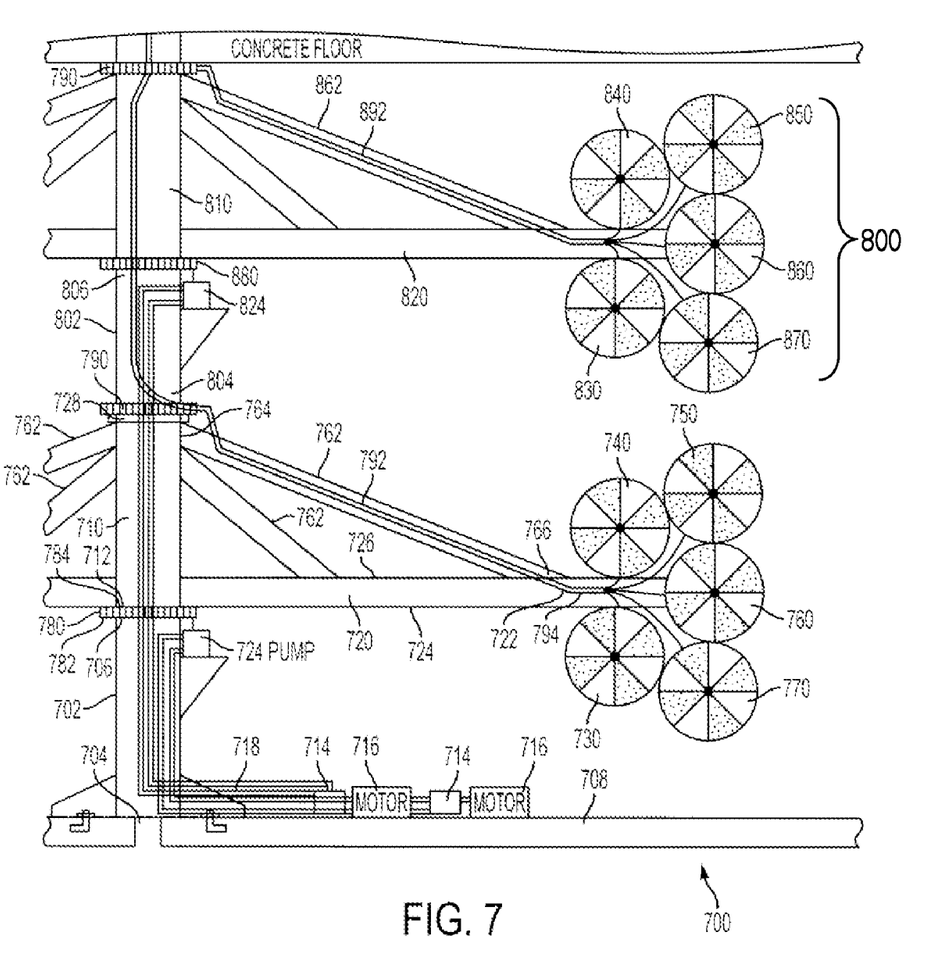
FIG. 7 is a side view of another embodiment of the power plant with fluid operated generator units.

The above described embodiments are power plant units that utilize one or more connection elements to attach a generator unit to a rotating arm. FIG. 7 is a side elevational view of a power plant unit (700) that mitigates or eliminates the length of the connection element extending from a rotating arm. In a similar manner to the above-described power plants, a primary vertical extension member (702) is provided with a proximal end (704) and a distal end (706) and a secondary vertical extension member (710) is provided with a proximal end (712) and a distal end (714). The proximal end (704) of the primary vertical extension member (702) rests on a primary planar surface (708). The distal end (706) of the primary vertical extension member (702) is in communication with the proximal end (712) of the secondary vertical extension member (710). The primary vertical extension member (702) is stationary, while the secondary vertical extension member (710) is configured to rotate about the axis of the primary vertical extension member (702). In one embodiment, the secondary vertical extension member (710) has a greater circumference than that of the primary vertical extension member (702).

As shown, one or more rotatable arms (720) are connected to the secondary vertical extension member (710). Each rotatable arm (720) has a first end (722) and a second end (not shown). The first end (722) is connected to and in communication with the secondary vertical extension member (710) adjacent to the proximal end (712). The second end (not shown) is remote from the first end (722). A plurality of fluid operated generator units (730), (740), (750), (760), and (770) are connected to and/or in communication with the first end (722) of the rotatable arm (720). In one embodiment, generator units (730), (740), and (760) are connected directly to the rotatable arm (720) and generator units (750) and (770) are indirectly connected to the rotatable arm (720). For example, generator unit (750) is shown connected to generator unit (740) and/or (760) and generator unit (770) is shown connected to generator unit (760) and/or (730).

As shown, one or more pumps (714) and one or more motors (716) are provided to operate the power plant (700) and are placed on the primary planar surface (708). Similarly, another pump (816) is provided adjacent to primary vertical extension member (702). One or more wires and hoses (718) extend from the motor(s) (716) and pumps (714). In one embodiment, a plurality of pumps and motors may be provided to the power plant unit (700) depending on the size of the unit and power requirements. The wires and hoses (718) extend into the primary vertical extension member (702), adjacent to the proximal end (704), toward the distal end (706) of the primary vertical extension member (702) and to a secondary pump (724) located adjacent to the distal end (706) of the primary vertical extension member (702). A mechanism (780) is provided to transmit energy to facilitate movement of the rotating arm (720) about the axis of the primary vertical extension member (702). The pump (724) receives fluid from the pump and motor (714) and (716), respectively, and communicates motion to a mechanism (780) through a shaft (816). In one embodiment and as shown in FIG. 7, the mechanism (780) is in the form of a gear mounted adjacent to a distal end (706) of the primary vertical member (702). In one embodiment, the pump(s) (714) is a hydraulic pump and it assists the gear (780) with rotation by providing the gear (780) with hydraulic fluid. However, the invention should not be limited to a hydraulic fluid for communication of a rotational force to the gear (780).

The gear (780) has a posterior side (782) and an anterior side (784). The posterior side (782) is mounted adjacent to a distal end (706) of the primary vertical member (702), and the anterior side (784) is mounted adjacent a proximal end (712) of secondary vertical extension member (710). Similarly, a posterior side (724) of the rotating arm (720) is mounted adjacent to the anterior side (784) of the gear (780), and an anterior side (726) of the rotating arm (720) is in communication with a secondary vertical member (710) and one or more support members (762). Each support member (762) has a proximal end (764) in communication with a distal end (714) of the secondary vertical extension member (710) and a distal end (766) in communication with the first end (722) of the rotating arm (720). The distal end (714) of the secondary vertical extension member (710) is adjacent to a rotating wire transfer system (790). Each generator unit (730), (740), (750), (760), and (770) has an electrical wire (792) to transfer electrical energy generated by the generator unit(s) to an electrical storage device (not shown) or a power grid. As shown the electrical wire (792) is in fact a plurality of wires, with each wire having a distal end (794) in communication with an assigned generator unit and a proximal end (not shown) in communication with the electrical storage device (not shown) or a power grid. The electrical wire (792) extends from the storage device (not shown), through the central vertical member (702) to the secondary vertical member (710) and through the support member (762) in communication with the first end (722) of the rotating arm (720). The wire (792) electrically connects the generator unit(s) (730)-(770) to the electrical storage device (not shown). In one embodiment, the wire (792) may follow an alternate path from the generator unit to the storage device (not shown). Similarly, although a wire is shown in here to communicate electrical energy between the generator unit and the storage device, in one embodiment, an alternate connection may be implemented between the generator unit and the storage device that facilitates communication and transmission of electrical energy. Accordingly, an electrical connection is provided between the electrical storage device and each generator unit (730), (740), (750), (760), and (770).

As shown in FIG. 7, a second power plant (800) may be in vertical communication with the power plant (700). More specifically, a vertical member (802) is provided with a proximal end (804) and a distal end (806). The proximal end (804) is adjacent to and in communication with a distal end (728) of the secondary vertical extension member (710) and the rotating wire transfer system (790). Wires and hoses (718) extend through the vertical members (702), (710) and (802) to a pump (824). The pump (824) receives fluid from the pump and motor (714) and (716), respectively, and communicates motion to a mechanism (880) through a shaft (826). The mechanism (880) transmits energy to facilitate movement of a rotating arm (820) about the axis of a vertical extension member (810) adjacent to and in communication with vertical member (802). Similarly, a second vertical member (810) is provided in communication with vertical member (802) to provide structural support for the rotating arm (820) and one or more support arms (862). One end of the rotating arm (820) has one or more generator units (830), (840), (850), (860), and (870) adjacently mounted thereto. Each of the generator units includes an electrical wire (892) to communicate electrical energy from the respective generator unit(s). In one embodiment, the generator units are in direct communication with the rotating arm (820), or they may be arranged in a manner similar to the units (730), (740), (750), (760), and (770). The electrical wires (892) are in communication with an electrical energy storage device (not shown). In one embodiment, the generator units in communication with rotating arm (820) may be in communication with the same storage unit or a different storage unit than the generator units in communication with rotating arm (720). Similarly, in one embodiment, additional sets of vertical members may be provided in communication with vertical members (802) and (810) to continue the vertical extension of the power plant (700).

Figure 8:
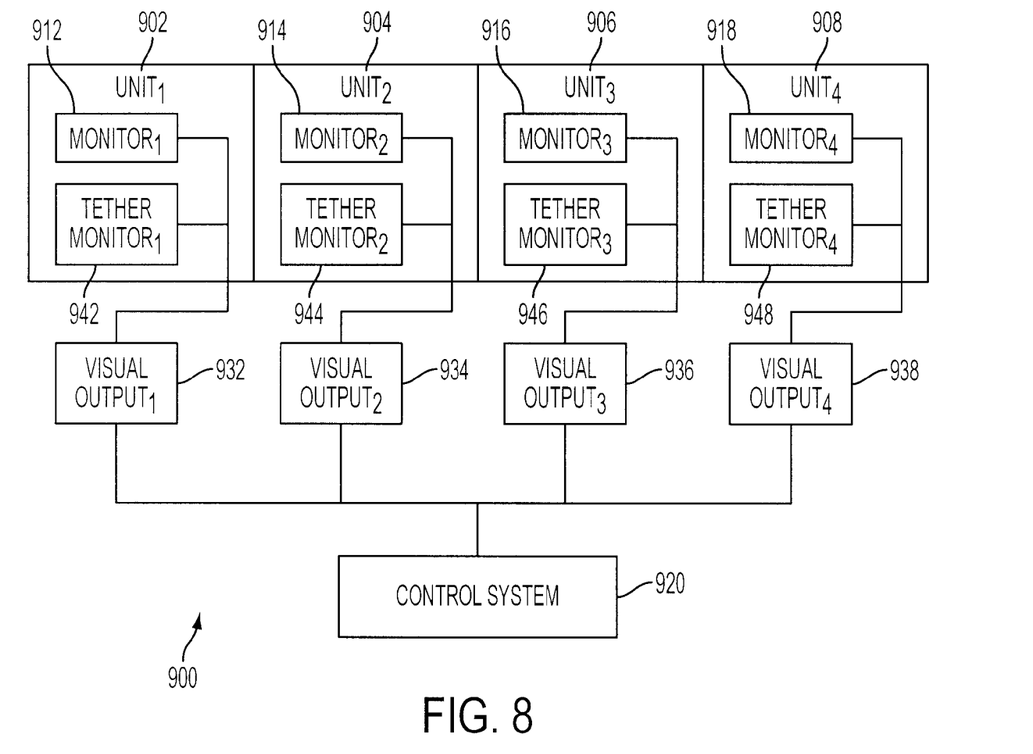
FIG. 8 is a block diagram of a control system associated with the power plant.

As noted above, the power plant includes one or more fluid responsive generators to create electrical energy from exposure of the generator to a fluid flow. FIG. 8 is a block diagram (900) of a control system used in association with the generator units to monitor and manage electrical output. Each generator unit has a monitor to track the electrical energy generated by the unit and stored in a battery in communication with the unit and/or communicated to an electrical grid. The example shown herein is for a power plant with four generator units (902), (904), (906), and (908) in communication with a rotating arm. Each unit has an energy monitor to track the electrical energy generated by the unit. More specifically, unit (902) has energy monitor (912), unit (904) has energy monitor (914), unit (906) has energy monitor (916), and unit (908) has energy monitor (918). Each of the energy monitors is connected to a control system (920) that manages the operation of the associated generator units. More specifically, the control system tracks and monitors the aggregate electrical output for all of the units, as well as the individual electrical output per unit. In one embodiment, an enclosure may be provided to house a plurality of generators and one or more monitors may be provided to track the electrical output of the individual generators in the enclosure, and/or track the cumulative electrical output of the enclosure units. If any one of the units is determined to be generating less than an optimal amount of electrical energy, i.e. not meeting a threshold for electrical energy output, this information is conveyed by the control system to a third party or third party device (not shown). In one embodiment, the control system is in communication with an output device. When it is determined that one or more units is not attaining a threshold level of electrical output, the output device provides a visual, auditory, or tactile signal. For example, in one embodiment, a visual output (932), (934), (936), and (938) may be associated with each unit (902), (904), (906), and (908), respectively. In one embodiment, the visual output is an LED that is either directly attached to the unit, or is located at a remote location to identify a specific unit. When one of the units does not reach a threshold level of output, the control system may illuminate the appropriate LED to convey a problem with the unit. Similarly, in one embodiment, each unit may have more than one LED associated therewith, with each LED having different illuminating colors, or each having the same color. A different color LED may be illuminated to convey different control data, or a pattern of LEDs may be illuminated or non-illuminated to convey different control data. Accordingly, the control system monitors operation of the associated units and conveys operational data of the unit(s).

The control system described above in FIG. 8 may be extrapolated to include monitors to tracks and manage the length of the wire(s) and/or connection element(s) between the rotating arm and the generator unit(s). More specifically, the distance between the generator unit and the rotating arm affects the electrical energy output of the generator unit. By adding length to the tether (wire and/or connection element), the fluid flow to the unit may be increased. A tether monitor may be provided in communication with each alternator unit. More specifically, unit (902) has tether monitor (942), unit (904) has tether monitor (944), unit (906) has tether monitor (946), and unit (908) has tether monitor (948). Each of the tether monitors is connected to a control system (920) that manages the operation of the associated generator units, and/or the associated visual display. More specifically, the control system tracks and monitors the aggregate electrical output for all of the units, as well as the individual electrical output per unit, in conjunction with the length of the tether extending from the rotating arm to the respective unit. Accordingly, the control system may be employed to modify the operational settings of the power plant to adjust the electrical energy output of the generator units.

As shown in FIG. 8, the control unit may be employed to monitor the electrical output of each unit in communication with the power plant and/or to modify initial settings of the power plant to adjust electrical output. Furthermore, as described above, the power plant employs a motor to provide power to the rotating arm. In one embodiment, the control system may employ one or more monitor to manage the speed of the rotating arm. Similarly, in one embodiment, the control system may employ one or more monitors to manage the speed of the motor. Accordingly, the control system may be employed to monitor and manage various modifiable aspects of the power plant.

Each of the power plant embodiments shown herein requires an initial quantity of energy to initiate movement of the rotating arm(s) and the associated generator units in communication with the rotating arms(s). The initial quantity of energy may be in the form of mechanical, electrical, bio-diesel energy, or any energy to which the motor is configured to accept as an energy source. In a similar manner, the motor described above may be configured to receive energy in the form of electrical, mechanical, bio-diesel, or any other appropriate energy source. The motor is designed to receive energy input in a continuous flow so that it may provide continuous movement of the rotating arm(s) of the power plant. In one embodiment, the initial energy input may be in a bio-diesel form and subsequent energy input may be in an alternative form.

The power plants are not wind zone dependent. More specifically, in the absence of a natural wind zone, the power plant creates it own wind zone and thereby creates an environment for producing energy by converting a created mechanical fluid flow into electrical energy. Accordingly, the power plant is versatile in that it can be placed in any local.

It will be understood that each of the elements above, may also be useful in alternative applications or constructions differing from the type described above and without departing from the spirit and scope of the invention. In particular, in one embodiment, the generator unit generates direct current electricity. However, the generator unit should not be limited to direct current. In one embodiment, the generator unit may be in the form of an alternator that generates alternating current electricity. The term "generator" described herein is interchangeable with a direct current or alternating current unit. Similarly, in one embodiment, a single material may be employed to serve the functionality of both the connection element and the wire. This simplifies the structure of the power plant by eliminating an extraneous filament between the generator unit and the wire transfer system. The generated electrical energy may be stored in the associated battery or any other electrical storage device, including but not limited to a capacitor or any other device with the ability to store or communicate electrical energy to a secondary device, or it may be used to recharge a battery in communication with the integrated unit or to provide electrical energy to a remote location.

Similarly, the power plants shown herein are illustrated with one or more generator units in communication with a rotor arm. In one embodiment, the individual generator units may be substituted with an enclosure that houses one or more fluid flow responsive generator units therein. Each of the generator units in the enclosure may be a modular generator component with rotational elements, magnets, and electrically conductive material. Rotation of the enclosure, caused by movement of the rotor arm, exposes the rotational elements of the generator units to a fluid flow, which generates fluid flow. In an embodiment with multiple generator units in a single enclosure, rotational elements of adjacently mounted units rotate in opposite direction to increase the fluid flow in the enclosure.

With respect to the magnets and electrically conductive material, one or more magnets rotate in conjunction with the rotational elements of the generator and in close proximity to the electrically conductive material, thereby generating electrical energy. In one embodiment, an alternative material may be substituted for the magnets, wherein the alternative material produces electrical energy when placed in proximity to electrically conductive material.

The power plants illustrated herein may be employed in various environments where they may create their own fluid flow. For example, the power plant may be house in an enclosure such as a building or garage, or any locale that is sized to accommodate the power plant. The elements described above may be useful for any application wherein a fluid force exerted on a fluid responsive generator unit can be utilized to rotate the rotational element. Fluid flow may come in the form of air flow, water flow, or an alternative fluid source that supports rotation of the rotational elements. In one embodiment, the power generated by the generator units is stored in a battery or a bank of batteries and used to power a local or remote motor in communication with the battery. Similarly, in one embodiment, the generated electrical energy may be communicated directly from the generator unit to an external motor or device requiring energy an input power source, or to a power grid providing energy to external energy consumers or consuming equipment. In addition, the vertical members and horizontal arms of the power plant should not be restricted to the angles disclosed herein. Rather, they may be at any angle that would enable rotation of the generator units to create a fluid flow and to convert the fluid flow to electrical energy. Accordingly, the scope of protection of this invention is limited only by the claims and their equivalents.

I claim:

1. An apparatus comprising:
    a vertical support member having a proximal end and a distal end, said proximal end secured to a planar platform;
    a rotating element having a proximal end and a distal end, said proximal end of said rotating element attached to said distal end of said vertical support member, and said rotating element adapted to rotate about an axis of said vertical support member;
    a connection element having a distal end and a proximal end, said proximal end in communication with said rotating element, and said distal end in communication with a generator unit;
    energy external to said generator unit and in communication with a motor to initiate and maintain rotational movement of said rotating element;
    fluid flow created by said initial rotational movement; and
    said generator unit to rotate on a horizontal axis and to generate electrical energy by exposure of said generator unit to said fluid flow, said generated electrical energy communicated to an electrical energy storage apparatus through said connection element.

2. The apparatus of claim 1, further comprising electrical energy generated by exposure of said generator unit to said fluid flow, wherein said generated electrical energy is communicated to an external electrical storage apparatus distant from said electrical energy storage apparatus.

3. The apparatus of claim 1, further comprising a first enclosure to house multiple generator units.

4. The apparatus of claim 1, further comprising an adjustment mechanism to control a length of said connection element from said rotating element to said generator unit.

5. The apparatus of claim 1, wherein said initial rotational movement of said rotating element lifts said generator unit from a rest position to a raised position.

6. The apparatus of claim 5, further comprising a change in vertical lift of said generator unit with respect to velocity of said rotating element.

7. The apparatus of claim 1, further comprising a first central member in communication with said rotating element, said first central member having an axis about which said rotating element moves.

8. The apparatus of claim 7, wherein said first central member is a device to turn the rotating element about an axis.

9. The apparatus of claim 8, further comprising an energy transfer system in communication with said device and said rotating element to transfer movement of said device to movement of said rotational element.

10. The apparatus of claim 1, wherein said connection element is in communication with a slip ring.

11. An apparatus comprising:
a first vertical support member having a proximal end and a distal end, said proximal end secured to a horizontal platform;
said first vertical support member to remain stationary;
a second vertical support member having a proximal end and a distal end, said proximal end in communication with said distal end of said first vertical support member;
a rotating element having a proximal end and a distal end, said proximal end of said rotating element attached to said second vertical support member, and said rotating element adapted to rotate about an axis of said second vertical support member;
said second vertical support member to rotate about its vertical axis in conjunction with rotation of said rotating element;
a first enclosure to house a first generator unit, said enclosure attached to a distal end of said rotating element;
external energy in communication with a motor to provide rotational movement of said rotating element; and
a fluid flow created by said initial rotational movement; and
said generator unit to convert said created fluid flow to electrical energy by exposure of said first generator unit to said fluid flow.

12. The apparatus of claim 11, further comprising said electrical energy to be transmitted to an external location.

13. The apparatus of claim 12, wherein said external location is selected from the group consisting of: an electrical storage unit and a power grid.

14. The apparatus of claim 13, further comprising an electrical connection element to transfer electrical energy produced by said generator unit in said first enclosure to a static electrical storage apparatus.

15. The apparatus of claim 14, further comprising an aperture in an interior section of said rotating element to extend from said distal end of said rotating element to said proximal end of said rotating element, wherein said interior section receives said electrical connection element to communicate transmission of electrical energy in relation to said generator unit.

16. The apparatus of claim 14, further comprising a secondary support with a proximal end and a distal end, wherein said proximal end of said secondary support is connected to said distal end of said second vertical support member and said distal end of said secondary support is connected to said distal end of said rotating element.

17. The apparatus of claim 16, further comprising an aperture in an interior section of said secondary support that extends from said proximal end to said distal end, wherein said aperture is adapted to receive said electrical connection element to transmit electrical energy between said first enclosure and an electrical storage member.

18. The apparatus of claim 11, wherein said first enclosure houses multiple generator units.

19. The apparatus of claim 18, further comprising said first generator unit housed in said first enclosure adjacent to a second generator unit housed in said first enclosure, said first generator unit having a first rotational element adapted to rotate in a first rotational direction and said second generator unit having a second rotational element adapted to rotate in a second rotational direction, wherein said first and second rotational directions are different.

20. The apparatus of claim 11, further comprising multiple secondary enclosures located proximal to said distal end of said rotating element, wherein said secondary enclosures are secured to an element selected from the group consisting of: said first secondary enclosure, said distal end of said rotating element, and combinations thereof.

21. The apparatus of claim 11, further comprising a third vertical support member having a proximal end and a distal end, said proximal end in communication with said distal end of said second vertical support member, said distal end in communication with a proximal end of a fourth vertical support member, a second rotating element having a proximal end and a distal end, said proximal end of said rotating element attached to said fourth vertical support member, said second rotating element adapted to rotate about an axis of said fourth vertical support member, and a secondary enclosure to house a generator unit, said enclosure attached to a distal end of said second rotating element; and electrical energy generated by exposure of said generator unit house within said secondary enclosure to said fluid flow.

22. The apparatus of claim 20, further comprising a second slip ring located between said fourth vertical support member and said third vertical support member to transfer power from rotation of said fourth vertical support member to said third vertical support member.

23. The apparatus of claim 11, further comprising a first slip ring located between said first and second vertical support members to transfer power from said rotation of said second vertical support member to said first vertical support member.

24. An apparatus comprising:
a vertical support member having a proximal end and a distal end, said proximal end secured to a planar platform;
a rotating element having a proximal end and a distal end, said proximal end of said rotating element attached to said distal end of said vertical support member, and said rotating element adapted to rotate about an axis of said vertical support member;
a first enclosure to house at least one generator unit;
a connection element having a distal end and a proximal end, said proximal end in communication with said rotating element, and said distal end in communication with said at least one generator unit;
energy external to said generator unit and in communication with a motor to initiate and maintain rotational movement of said rotating element;
fluid flow created by said initial rotational movement; and
said generator unit to rotate on a horizontal axis and to generate electrical energy by exposure of said generator unit to said fluid flow.

25. The apparatus of claim 24, wherein said initial rotational movement of said rotating element lifts said generator unit from a rest position to a raised position.

26. The apparatus of claim 24, further comprising a change in vertical lift of said generator unit with respect to velocity of said rotating element.

27. An apparatus comprising:
- a vertical support member having a proximal end and a distal end, said proximal end secured to a planar platform;
- a rotating element having a proximal end and a distal end, said proximal end of said rotating element attached to said distal end of said vertical support member, and said rotating element adapted to rotate about an axis of said vertical support member;
- a connection element having a distal end and a proximal end, said proximal end in communication with said rotating element, and said distal end in communication with a generator unit;
- an adjustment mechanism to control a length of said connection element from said rotating element to said generator unit;
- energy external to said generator unit and in communication with a motor to initiate and maintain rotational movement of said rotating element;
- fluid flow created by said initial rotational movement; and
- said generator unit to rotate on a horizontal axis and to generate electrical energy by exposure of said generator unit to said fluid flow.

28. The apparatus of claim 27, wherein said initial rotational movement of said rotating element lifts said generator unit from a rest position to a raised position.

29. The apparatus of claim 28, further comprising a change in vertical lift of said generator unit with respect to velocity of said rotating element.

* * * * *